United States Patent [19]

Cilloniz Oberti

[11] 3,949,616

[45] Apr. 13, 1976

[54] MECHANICAL REMOTE CONTROL DEVICE FOR OPERATING THE CHANNEL SELECTOR OF A TELEVISION RECEIVER

[76] Inventor: Manuel Cilloniz Oberti, P.O. Box 554, Lima, Peru

[22] Filed: Oct. 8, 1974

[21] Appl. No.: 513,162

[52] U.S. Cl. ...................... 74/10 A; 74/142; 74/575; 200/332; 325/390

[51] Int. Cl.² .......................................... F16H 38/18

[58] Field of Search ........ 74/10 A, 142, 141.5, 575; 325/390, 457; 200/161, 331

[56] References Cited

UNITED STATES PATENTS

| | | | |
|---|---|---|---|
| 382,765 | 5/1888 | Mackay | 403/340 |
| 984,053 | 2/1911 | Weber, Sr. | 200/161 |
| 2,769,344 | 11/1956 | Block et al. | 74/10 A |
| 3,034,815 | 5/1962 | McCormick et al. | 403/340 |
| 3,643,052 | 2/1972 | Marshall, Jr. | 200/161 X |

FOREIGN PATENTS OR APPLICATIONS

| | | | |
|---|---|---|---|
| 28,272 | 10/1917 | Norway | 200/331 |

*Primary Examiner*—Allan D. Herrmann
*Assistant Examiner*—F. D. Shoemaker
*Attorney, Agent, or Firm*—Wenderoth, Lind & Ponack

[57] ABSTRACT

A toothed wheel is fixed to the control shaft of a television channel selector. A second class lever is mounted to freely rotate about a fulcrum colinear with the axis of the control shaft. A remotely operable cord is attached to the lever at an end thereof opposite the fulcrum to rotate the lever about the fulcrum. A pawl is mounted on the lever and has a hook end which engages the teeth of the toothed wheel. When the lever rotates, the pawl rotates the toothed wheel and thus the control shaft.

20 Claims, 7 Drawing Figures

MECHANICAL REMOTE CONTROL DEVICE FOR OPERATING THE CHANNEL SELECTOR OF A TELEVISION RECEIVER

BACKGROUND OF THE INVENTION

The present invention relates to an improved mechanical remote control device for operating the channel selector of a television receiver. More particularly, the present invention is directed to such a device that one can be adapted to such selector mechanism, for the purpose of actuating it from a remote position by means of a manually operable pull cord.

It is well understood bother for the viewer of a television receiver to switch the channels of the apparatus, due to the distance which normally separates the viewer from the receiver. The difficulty increases when the viewer is incapacitated for reasons of health and must move from a seat or bed for the purpose of changing channels. This has led to the creation of various remote control methods and devices which allow the changing of channels to be performed from a resting position of the viewer.

Even though such known remote control systems perfectly fulfill their purpose, they are associated with the disadvantage of being very complex and costly. Further, such known systems must be attached to the selector of which they form an integral part. This requires in some cases that the manufacturer of the television receiver include such remote control device within the cabinet, or provide therein sufficient space for a later installation. This is often not possible since each of such devices is substantially different in concept and in structure. Another disadvantage of known devices is that, due to their complex structure, the devices are subject to failure and constant imperfections, which results in high maintenance costs and short useful life.

These difficulties are present in any of the known remote control systems that employ electric, eletromagnetic or sonic energy, since such systems are very costly.

One previously known attempt to provide a mechanical remote control device is shown in U.S. Pat. No. 1,925,991 to Shaw, which describes a device for rotating the control knobs for volume control and for controlling the condenser of a radio receiver, by means of flexible shaft connected to each of such knobs. The operator, situated at a distance from the receiver, rotates the shaft to produce the rotation of the desired knob. The shaft is enclosed within a flexible tube that is not rotatable, and the device is provided with a rotary disk joined to the shaft and operated manually by the user. According to this arrangement, the rotary movement of the disk produced by the operator is transmitted through the flexible shaft or cable to the selector knob. However, such rotation requires a relatively great effort, due to the large friction surface between the flexible shaft and the tubular cover, and further due to the actual twisting to which the shaft is subjected.

U.S. Pat. No. 2,769,233 to Block et al. describes another known mechanical remote control device provided with a pull cord manipulated by a remotely positioned operator for the purpose of actuating a clamp or hammer connected to an indented wheel, in such a manner that each advance of the clamp drives the wheel by a tooth thereof, and consequently the shaft of the selector joined thereto. In this arrangement the device consists of a fixed and stationary element which surrounds the selector shaft and which is firmly joined to the front panel of the set, a second rotary element mounted on the shaft and in front of the first element for producing a cavity between the two, and mechanical means situated within such cavity for transforming linear movement into rotation, through the effect of traction to which the cord is subjected. This arrangement, however, has not proven to be practical, since the device must be placed in position in the factory or by a skilled technician, due to the fact that the apparatus must be disassembled in order to attach the device, and further due to the great inconvenience that the actuating arm of the clamp which is necessarily situated within the cavity must be of a very short length. Therefore, the lever arm is small and produces a very low power. Accordingly, the operator must exert a relatively strong pull on the cord, which may cause movement and even dropping of the receiver. Also, a large portion of the traction or pulling force exerted on the cord is absorbed by the cabinet due to friction and inertia. Consequently, the cord must be thick and strong in order to avoid breaking.

SUMMARY OF THE INVENTION

Consequently, a primary object of the present invention is to provide a mechanical remote control device that can be adapted to any television receiver, and with which the channels of the receiver can be switched from a remote position and without any substantial effort by the user.

Another object of the present invention is to provide such a remote control device for bringing about the rotation of the channel-selector knob, wherein the force applied by the operator is of such a low magnitude that it does not produce any risk of dropping the cabinet of the receiver.

Still another object of the present invention is to provide such a remote control device that has a simple structure and can be readily installed by the user, but which, when desired, permits direct operation of the channel-selector knob by the user.

These objects are achieved in accordance with the present invention by the provision of a mechanical, manually operated remote control device, with which linear movement produced by the operator is smoothly transformed into rotary movement, with high efficiency of power transduction, in order to overcome without difficulty the inertia and the torque of the channel selector of a television receiver.

The invention consists in applying the principle of a lever of the second class, wherein the resistance or weight is placed between the fulcrum and the power, for transducing a linear force applied to a cord into an increased tangential force that acts on the teeth of an indented or rachet wheel coupled to the shaft of the channel-selector device, in order to rotate the shaft an amount in proportion to the applied force.

The power arm of the operating lever has a length several times greater than that of the resistance arm, and the fulcrum of the lever is situtated on the shaft of the channel selector. The effort or force applied by the resistance arm is higher than that applied by the cord to the power arm. Also, the amount of movement of the outer end of the power arm is greater than the amount of movement of the resistance arm, which is convenient since the latter requires only a short displacement to move the wheel a distance equal to the pitch between the teeth thereof. This arrangement differs advantageously from that of U.S. Pat. No. 2,769,233, wherein the operating lever is of the first class and possesses a short length, so that the effort or power arm is only slightly larger than the load arm, thereby requiring a relatively great effort for bringing about the rotation of the selector shaft, which effort may cause the movement and dropping of the receiver.

Therefore, the device of the invention consists of a lengthened lever arm, one end of which is freely mounted on the shaft of the channel selector and the other end of which is connected to a pull cord manipulated by the operator. The arm has a pawl attached thereto near the fulcrum and engageable in an indented wheel firmly secured to the shaft. Thus, a relatively large movement, due to a relatively small power, of the lever causes a smaller movement, due to a larger force, of the shaft. Means are also provided for limiting the angular movement of the lever arm and for returning the arm to an original position of rest.

According to the invention, the operator situated at a remote point pulls the cord, thus producing a traction effort on the end of the power arm and causing it to perform an angular movement of distinct amplitude, the imaginary axis of the angle coinciding with the axis of rotation of the channel selector. Simultaneously, the pawl, one end of which is attached to the lever arm and the other end of which rests by gravity one one of the teeth of the indented wheel, also executes such angular movement and exerts pressure on the tooth and thus advances the tooth. This causes the rotation of the indented wheel and of the selector shaft coupled thereto. When the traction force exerted on the cord is removed, a return device, such as a spring forces the return of the lever arm into the initial position determined by a stop. Accordingly, the effort of traction is small, but it is multiplied by the value of the ratio between lengths of the power arm and the resistance arm. Preferably, such value is at least greater than four, and thus the force acting on the indented wheel is of sufficient magnitude for easily bringing about its rotation, together with the rotation of the shaft of the channel selector.

The present invention also provides an arrangement for connecting the device lever to the control knob of the channel selector, especially to such a knob provided with an external handle in the form of a short diametral wall.

BRIEF DESCRIPTION OF THE DRAWINGS

These and other features of the invention will be described in more detail in the following description taken with the attached drawings, which show preferred embodiments of the invention, without limiting the scope thereof. In the drawings.

DETAILED DESCRIPTION OF THE INVENTION

Figure 2:
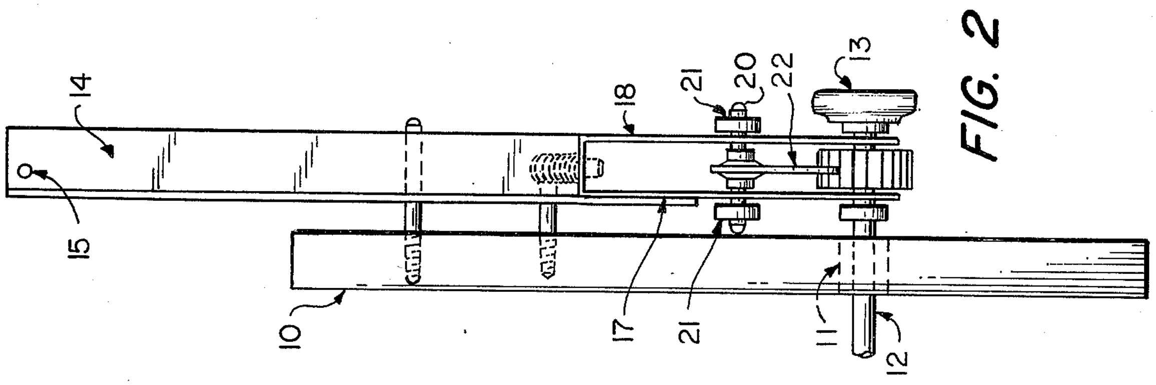
FIG. 2 is a lateral view of the device of FIG. 1.

With reference to the drawings, wherein the same reference numerals designate like parts of elements, a front panel 10 of a television receiver is provided with a circular opening 11 traversed by a shaft 12 of the channel selector device, a knob or operating disk 13 being attached to the end of the shaft. A flat or angular extended lever 14 is provided with a hole 15 at one end thereof and in which there is attached a pull cord 16. At its opposite end, i.e. in the illustration the lower portion, lever 14 is bifurcated, forming parallel spaced walls 17 and 18, each of which is provided with an opening 19. The diameter of openings 19 is greater than that of shaft 12, so that shaft 12 can easily pass through openings 19. In this manner, lever 14 can be freely moved angularly about the center of rotation of shaft 12 in a plane perpendicular thereto, by pulling the cord 16 in the direction of arrow 16*a* in FIG. 1.

A shaft 20 extends between walls 17 and 18 at a position slightly spaced from openings 19, and is secured in a stationary position by means of adjusting screws 21. In the area enclosed between walls 17 and 18 there is loosely mounted on shaft 20 motive means such as a pawl 22 provided with end hook 23, which can engage by gravity the teeth of an indented or ratchet wheel 24, integral with a short bushing 25, that is fixedly attached to shaft 12 by means such as a setscrew which is not shown in the drawings.

In the embodiment above explained, lever 14 is a lever of the second class, and the force of traction applied at point 15 multiplied by the distance between point 15 and axis of rotation of lever 14 equals the resistance offered by the tooth multiplied by the distance between the center of shaft 20 and the center of shaft 12. Preferably the ratio of length of lever 14 to the length between shafts 20 and 12 is at least two, and even more preferably greater than four. It will thus be seen that a minimum force applied by cord 16 and with a large amplitude of movement of the power arm, a large resistance can be overcome with a minimal movement of the resistance arm, i.e. pawl 22 or the portion of lever 14 between shaft 20 and shaft 12, such minimum force being sufficient, e.g. for advancing wheel 24 by a distance between the teeth thereof. The power force is thus increased in accordance with the ratio existing between the lengths of the power arm and the resistance arm, so that shaft 12 is turned without considerable effort on the part of the user, and inertia and torque are readily overcome.

Subsequent to the angular movement of lever 14 and the resulting rotary advance of indented wheel 24, the lever is returned to its original position through the retractive force of suitable return means, such as a spiral spring 26, one end of which is attached to an ear 27 integral with lever 14 and the other end of which is attached to means such as an eyebolt 28 attached to the panel or tc the body of the television cabinet. Retracted lever 14 rests on a stop 29 likewise inserted into the panel or the cabinet. Cord 16 changes direction by means such as a small grooved pulley 30, that rotates freely on a shaft 31 attached to the panel of the cabinet. alternatively, the cord 16 may pass through the ring of a simple eyebolt, which can thus be employed in place of pulley 30.

In a preferred embodiment of the device of the invention bushing 25 is sufficiently extended or lengthened so that arms 17 and 18 of lever 14 are freely and rotatably mounted on such bushing which is attached to shaft 12. Thus, the entire device is formed as a single unit which may be attached directly to shaft 12.

In another preferred embodiment openings 19 are provided in the form of elongated channels extending to the ends of walls 17 and 18. Lever 14 is then readily positioned on shaft 12 or bushing 25.

When the primary operating knob 13 of the television receiver consists of a disk provided with an outwardly extending diametral projection 13*a*, the remote control device of the present invention can be directly attached thereto by means of an adaptor as shown in FIGS. 3 through 6. In this case, an adaptor element 32 consists of a disk 33 having integral therewith two parallel and separate wings 34. The diametral projection 13*a* of the primary operating knob 13 fits between the wings 34 which are tightened together by means such as bolts 35. The opposite face of disk 33 is integral with a shaft 36 which is coaxial with shaft 12 and on which the device of the invention is mounted.

Figure 1:
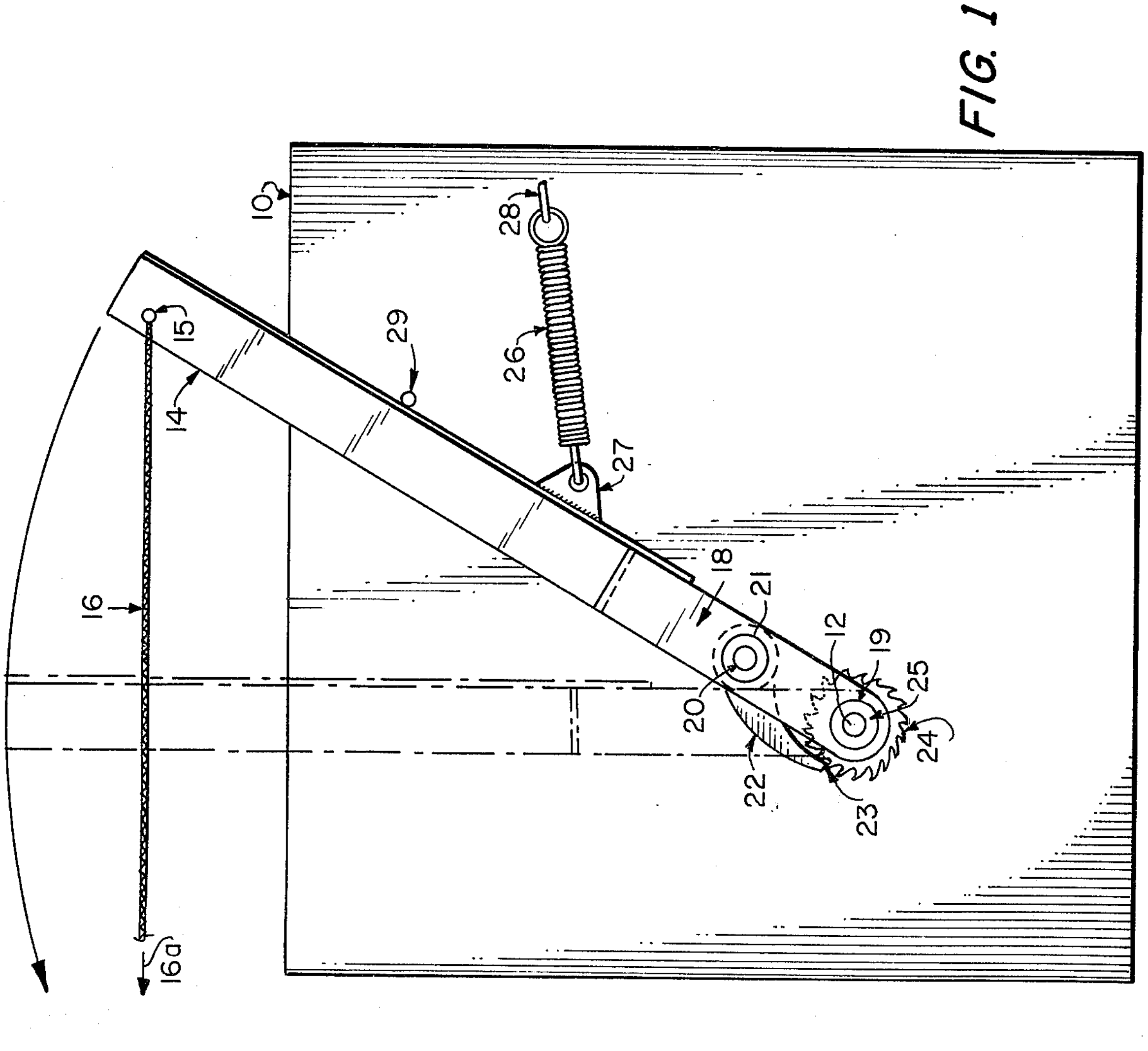
FIG. 1 is a front view of the device of the invention attached to the shaft of the channel selector of a television receiver, and showing a portion of the pull cord to be operated by the user.
Figure 4:
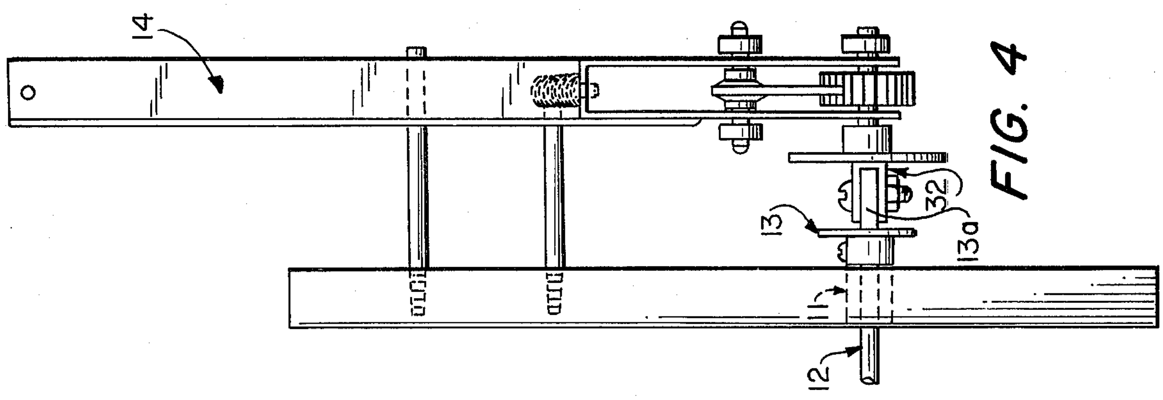
FIG. 4 is a lateral view of the device of FIG. 3.
Figure 3:
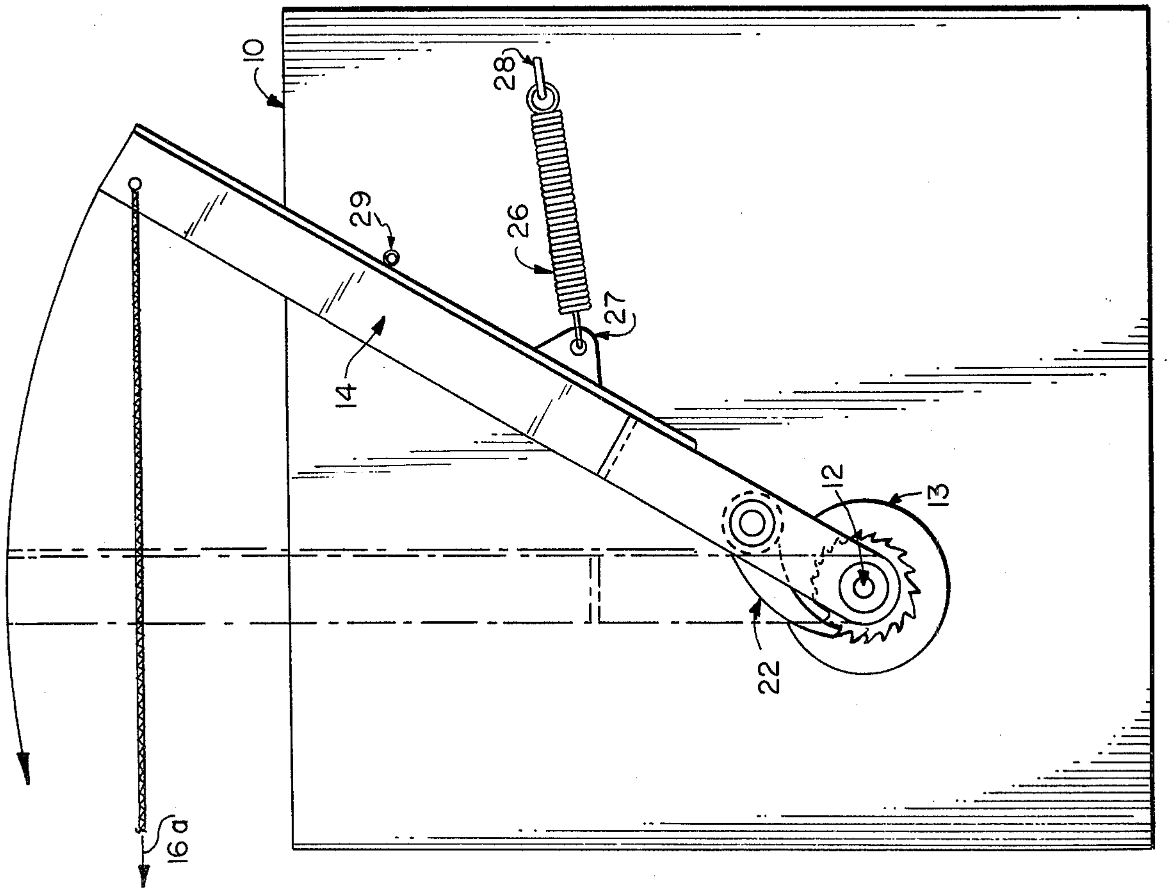
FIG. 3 is a front view of another embodiment of the invention.
Figure 5:
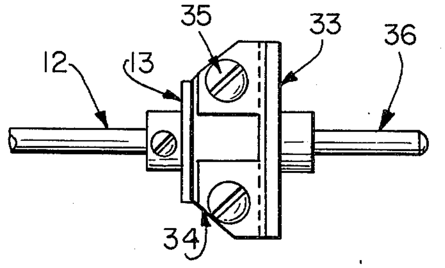
FIG. 5 is an enlarged view of a connection that can be adapted to the device of the invention.
Figure 6:
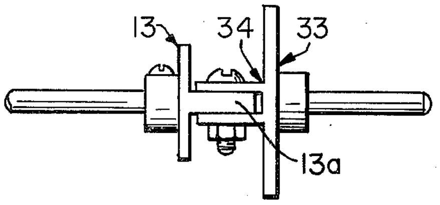
FIG. 6 is a view of the connection of FIG. 5, rotated by 90°.
Figure 7:
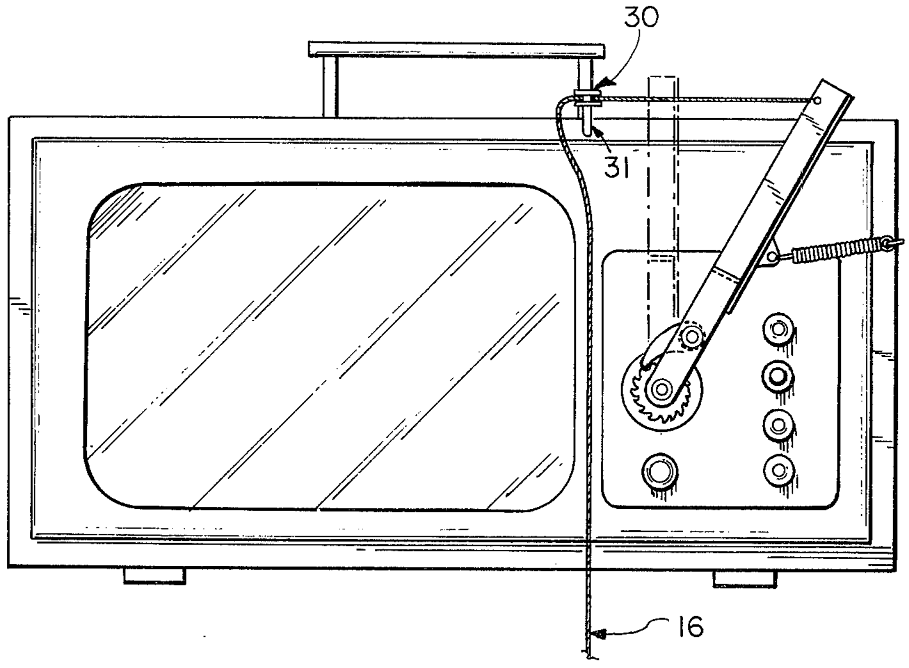
FIG. 7 is a front view of a television receiver showing the device of the invention installed therein and the manner of achieving a change of direction of the pull cord.

When the user pulls cord 16, from any position in front of the television receiver, lever 14 is displaced angularly in the direction indicated by arrows 16*a* in FIGS. 1 and 3. Elastic spring 26 is stretched, while hook end 23 of pawl 22, resting on a tooth of wheel 24, rotates wheel 24 together with shaft 12 until lever 14 assumes the position indicated in FIGS. 1 and 3 by phantom lines. When the user stops pulling cord 16, the retractive force of spring 26 forces the return of lever 14 into its original position until it rests on stop 29. The operator may exert an intermittent pull on cord 16, in order to produce an intermittent movement of rotation of shaft 12 until the desired channel is found.

It will be apparent that variations and modifications of the specifically described embodiments may be made without departing from the spirit and scope of the present invention.

What is claimed is:

1. A mechanical remote control device for rotating the control shaft of the channel selector of a television receiver, said device comprising:

a ratchet gear adapted to be fixedly attached to said channel selector for rotating said control shaft thereof, said ratchet gear having a rotational axis colinear with the axis of said control shaft;

a second class lever having a fulcrum adjacent a first end thereof and spaced from a second end thereof, said lever being freely rotatably mounted about said ratchet gear with said fulcrum coaxial with said rotational axis of said ratchet gear;

power applying means comprising a cord attached to said lever at a position adjacent said second end thereof for rotating said lever about said fulcrum;

motive means comprising a pawl freely mounted on said lever at a position thereof between said fulcrum and said second end and having a hook end engageable with said ratchet gear for transmitting rotary movement of said lever into rotary movement of said ratchet gear, and to thereby rotate said control shaft; and the length of said lever from the attachment of said cord to said fulcrum forming a power lever, and the length of said lever from the attachment of said pawl to said fulcrum forming a resistance lever, the length of said power lever being at least twice the length of said resistance lever.

2. A device as claimed in claim 1, wherein said cord entends from said lever to a remote user location.

3. A device as claimed in claim 1, wherein said ratchet gear is adapted to be fixedly coaxially attached to said control shaft.

4. A device as claimed in claim 3, further comprising a bushing integral with said ratchet gear.

5. A device as claimed in claim 4, wherein said lever has at said fulcrum thereof opening means for mounting said lever, said bushing extending through said opening means.

6. A device as claimed in claim 1, wherein said control shaft has fixed thereto an operating knob with an outwardly extending diametral projection, and further comprising an adaptor fixedly attachable to said knob, said ratchet gear being fixedly attached to said adaptor.

7. A device as claimed in claim 6, further comprising a shaft extending from said adaptor colinear to said control shaft, said ratchet gear being fixedly coaxially attached to said shaft.

8. A device as claimed in claim 6, further comprising a bushing integral with said ratchet gear.

9. A device as claimed in claim 8, wherein said lever has at said fulcrum thereof opening means for mounting said lever, said bushing extending through said opening means.

10. A device as claimed in claim 1, further comprising restoring means attached to said lever for moving said lever in opposition to said power applying means.

11. In a television receiver including a channel selector having a control shaft, and a mechanical remote control device for rotating said control shaft, the improvement wherein said control device comprise:

a ratchet gear fixedly attached to said channel selector for rotating said control shaft, said ratchet gear having a rotational axis colinear with the axis of said control shaft;

a second class lever having a fulcrum adjacent a first end thereof and spaced from a second end thereof, said lever being freely rotatably mounted about said ratchet gear with said fulcrum coaxial with said rotational axis of said ratchet gear;

power applying means comprising a cord attached to said lever at a position adjacent said second end thereof for rotating said lever about said fulcrum;

motive means comprising a pawl freely mounted on said lever at a position thereof between said fulcrum and said second end and having a hook end engageable with said ratchet gear for transmitting rotary movement of said lever into rotary movement of said ratchet gear, and to thereby rotate said control shaft; and the length of said lever from the attachment of said cord to said fulcrum forming a power lever, and the length of said lever from the attachment of said pawl to said fulcrum forming a resistance lever, the length of said power lever being at least twice the length of said resistance lever.

12. The improvement claimed in claim 11, wherein said cord extends from said lever to a remote user location.

13. The improvement claimed in claim 11, wherein said ratchet gear is fixedly coaxially attached to said control shaft.

14. The improvement claimed in claim 13, further comprising a bushing integral with said ratchet gear.

15. The improvement claimed in claim 14, wherein said lever has at said fulcrum thereof opening means for mounting said lever, said bushing extending through said opening means.

16. The improvement claimed in claim 11, wherein said control shaft has fixed thereto an operating knob with an outwardly extending diametral projection, and further comprising an adaptor fixedly attachable to said knob, said ratchet gear being fixedly attached to said adaptor.

17. The improvement claimed in claim 16, further comprising a shaft extending from said adaptor colinear to said control shaft, said ratchet gear being fixedly coaxially attached to said shaft.

18. The improvement claimed in claim 16, further comprising a bushing integral with said ratchet gear.

19. The improvement claimed in claim 18, wherein said lever has at said fulcrum thereof opening means for mounting said lever, said bushing extending through said opening means.

20. The improvement claimed in claim 11, further comprising restoring means attached to said lever for moving said lever in opposition to said power applying means.

* * * * *